United States Patent [19]

Dortch

[11] 4,417,748
[45] Nov. 29, 1983

[54] TRAILER SWIVEL HITCH GUIDE

[76] Inventor: Laurence E. Dortch, 400 W. Central, Apt. 512, Wichita, Kans. 67203

[21] Appl. No.: 339,744

[22] Filed: Feb. 4, 1982

[51] Int. Cl.³ .............................................. B60D 1/00
[52] U.S. Cl. ..................................... 280/477; 280/511
[58] Field of Search ................... 280/477, 478 B, 507, 280/511

[56] References Cited

U.S. PATENT DOCUMENTS

| 3,093,395 | 6/1963 | Bootwell | 280/478 |
|---|---|---|---|
| 3,420,549 | 1/1969 | Robinson | 280/477 |
| 3,747,958 | 7/1973 | Hackett | 280/477 |
| 3,773,356 | 11/1973 | Eichels et al. | 280/477 |
| 3,879,062 | 4/1975 | Miller | 280/477 |
| 4,226,438 | 10/1980 | Collins | 280/477 |
| 4,254,968 | 3/1981 | Del Vecchio | 280/477 |

Primary Examiner—Joseph F. Peters, Jr.
Assistant Examiner—Donn McGiehan
Attorney, Agent, or Firm—Edwin H. Crabtree

[57] ABSTRACT

A trailer swivel hitch guide for attachment on a bumper of a vehicle and received around a trailer hitch ball secured to the bumper. The guide used for guiding the tongue of a trailer so the tongue is centered over the top of the ball when securing the trailer to the vehicle. The guide can then be released so it swivels on the bumper when the trailer is pulled behind the vehicle.

6 Claims, 4 Drawing Figures

TRAILER SWIVEL HITCH GUIDE

BACKGROUND OF THE INVENTION

This invention relates to a trailer hitch guide and more particularly but not by way of limitation to a hitch guide which can be mounted on the bumper of the vehicle and swivel thereon when the vehicle pulls a trailer therebehind.

Heretofore, there have been various types of trailer hitch guides such as U.S. Pat. No. 4,226,438 to Collins, U.S. Pat. No. 3,879,062 to Miller, U.S. Pat. No. 3,944,259 to Miller, U.S. Pat. No. 3,773,356 to Eichels et al, U.S. Pat. No. 3,747,958 to Hackett and U.S. Pat. No. 4,254,968.

The above mentioned patents describe various types and construction of trailer hitch guides. Not one of these hitch guides are adapted to swivel around a hitch ball and therefore they are subject to contact and damage by the tongue of the trailer when the pulling vehicle makes a sharp turn. The subject invention eliminates the problem of the tongue of the trailer damaging the sides of a hitch guide along with additional advantages as described herein.

SUMMARY OF THE INVENTION

The subject trailer swivel hitch guide is simple in design, rugged in construction and can be adapted for receipt around various sizes of trailer hitch balls and receipt on the bumper of a vehicle.

The trailer swivel hitch guide eliminates the problem of having to manhandle the tongue of a trailer when trying to center the bottom of the tongue over the top of the hitch ball. The hitch guide accomplishes the centering of the tongue over the ball automatically when the vehicle backs under the tongue of the trailer when it is desired to attach the trailer to the bumper of the vehicle.

The swivel hitch guide provides the unique advantage of when the tongue of the trailer is secured to the hitch ball, the hitch guide can be released so it swivels on top of the bumper thereby preventing the tongue of the trailer from damaging the sides of the hitch guide when the vehicle pulls the trailer into a sharp curve or when the vehicle backs the trailer rearwardly into a jackknife position.

Further, the trailer swivel hitch guide can be quickly mounted around the hitch ball and secured to the bumper by making a single aperture in the bumper for receiving the end of a lock pin which secures the swivel hitch guide when attaching the trailer to the bumper. Further, a snap-ring is provided for attachment to an insert sleeve received around the threaded shank of the hitch ball to prevent vertical movement of the swivel hitch guide when the trailer is pulled behind the vehicle.

The trailer swivel hitch guide for attachment on the bumper of a vehicle and receipt around a trailer hitch ball secured to the bumper includes a base plate having a front, rear and sides. The base plate has an aperture therethrough for receipt around the ball. The plate rests on top of the bumper. An upright sidewall is attached to the sides of the base plate and is angled inwardly toward the ball and around the rear of the plate. The sidewall acts to guide the tongue of the trailer so it is centered above the hitch ball when the vehicle is backed rearwardly for attaching the trailer to the bumper of the vehicle. Further, the swivel hitch guide includes a "L" shaped lock pin mounted on the side of the sidewall with the end of the lock pin received in an aperture in the bumper. When the lock pin is received in the aperture, the swivel hitch guide is secured to the bumper so it will not swivel when attaching the tongue of the trailer to the ball. The lock pin is then moved upwardly releasing the swivel hitch guide from the bumper so the hitch guide can swivel when the vehicle pulls the trailer therebehind.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
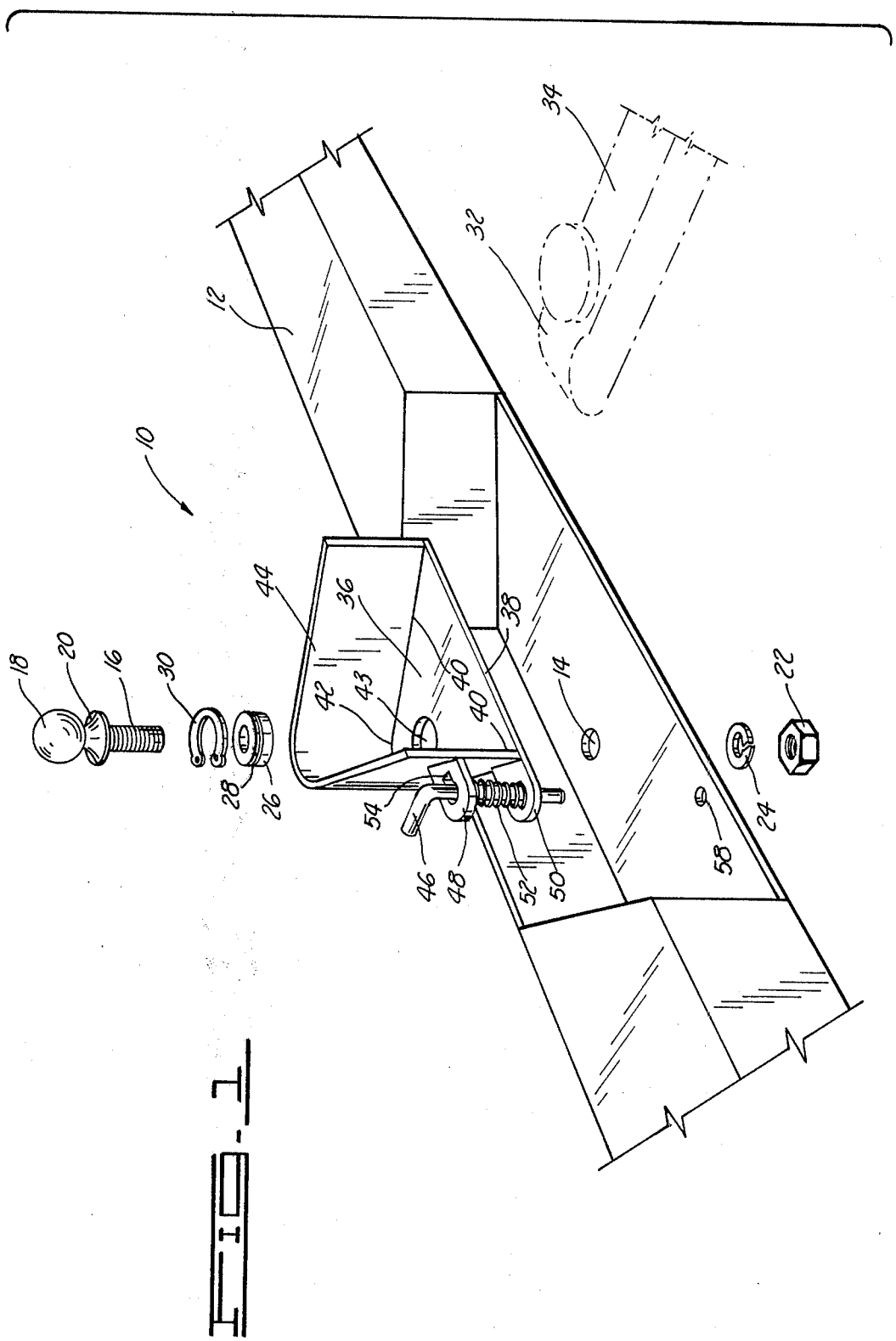
FIG. 1 is a perspective view of the trailer swivel hitch guide in position for mounting on the bumper of a vehicle.

In FIG. 1 the trailer swivel hitch guide is designated by general reference numeral 10. The guide 10 is adapted for mounting on a vehicle bumper 12 having a hitch ball aperture 14 therethrough. The aperture 14 in the bumper 12 is used for receiving a threaded shank 16 of a hitch ball 18 with a ball collar 20. The threaded shank 16 is secured by a ball nut 22 with lock washer 24. Received around the threaded shank 16 and resting against the bottom of the collar 20 is an insert sleeve 26 having a snap-ring groove 28 for receiving a snap-ring 30 therearound.

The ball 18 is a standard trailer hitch ball and is used for receiving a trailer tongue 32 of a trailer 34. The tongue 32 and a portion of trailer 34 are shown in dotted lines.

The trailer swivel hitch guide 10 includes along with the insert sleeve 26 and snap-ring 30 a base plate 36 having a front 38, sides 40 and a rear 42. Also the base plate 36 includes a base plate aperture 43 therethrough. The aperture 43 has a diameter greater than the ball 18 and collar 20 so it can be received therearound when mounting the guide 10 on the bumper 12. Attached to the sides 40 and angled inwardly and around the rear 42 of the base plate 36 is an upright sidewall 44 which has an overall height greater than the height of the ball 18 extending upwardly from the bumper 12. The sidewall 44 of the guide 10 acts to guide the tongue 32 of the trailer 34 should it be off center when the vehicle is moved rearwardly for securing the tongue 32 to the ball 18. It can be appreciated, should the tongue 32 be off center from the top of the ball 18 the sidewall 44 because it is angled inwardly toward the ball 18 automatically moves the tongue 32 as it is received above the bumper 12 until the tongue 32 is centered above and adjacent the ball 18.

The trailer swivel hitch guide 10 further includes a "L" shaped lock pin 46 which is slidably received in an upper pin bracket 48 and a lower pin bracket 50.

Mounted around a portion of the lock pin 46 is a coil spring 52 disposed between the brackets 48 and 50 for biasing the pin 46 upwardly or unlocked position. The upper bracket 48 includes a slot 54 for receiving a pin stud 56. The stud 56 is formed in the side of the pin 46 and can be seen in FIGS. 2 and 3. The end of the "L" shaped pin 46 when in a locked position is received in a lock pin aperture 58 in the bumper 12.

Figure 2:
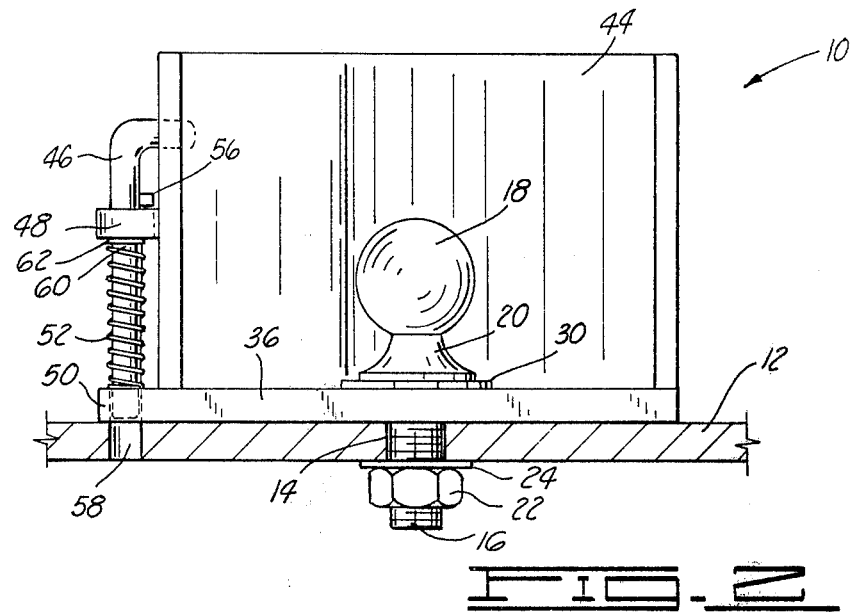
FIG. 2 is a front view of the trailer swivel hitch guide mounted on top of the bumper with the lock pin in a raised unlocked position.

In FIG. 2 a front view of the trailer swivel hitch guide 10 can be seen with the guide 10 received on top of the bumper 12 and the ball 18 secured thereto. In this position the "L" shaped lock pin 46 is in an unlocked position with the pin stud 56 resting on top of the upper bracket 48 and the end of the pin 46 removed from the lock pin aperture 58. By rotating the lock pin 46 so the pin stud 56 is received through the slot 54 and urging the stud 56 downwardly past the bottom of the upper pin bracket 48, it can be appreciated that the end of the pin 48 is then received in the lock pin aperture 58. The lock pin 46 is then rotated with the pin stud 56 resting against the bottom of the upper pin bracket 48 so the guide 10 is secured in place on top of the bumper 12. In this locked position, the guide 10 is now ready to receive the tongue 32 of the trailer 34 and the guide 10 is prevented from moving as the sidewall 44 acts to guide the tongue 32 above the ball.

The lock pin 46 also includes a snap-ring groove 60 for receiving a snap-ring 62 therein. The spring 52 and snap-ring 62 bias the pin 46 upwardly in an unlocked position and prevent the end of the pin 46 from inadvertently dropping downwardly into the aperture 58 and causing damage to the guide 10 when the trailer is being pulled. By removing the snap-ring 62, the pin 46 can be quickly disassembled.

Figure 3:
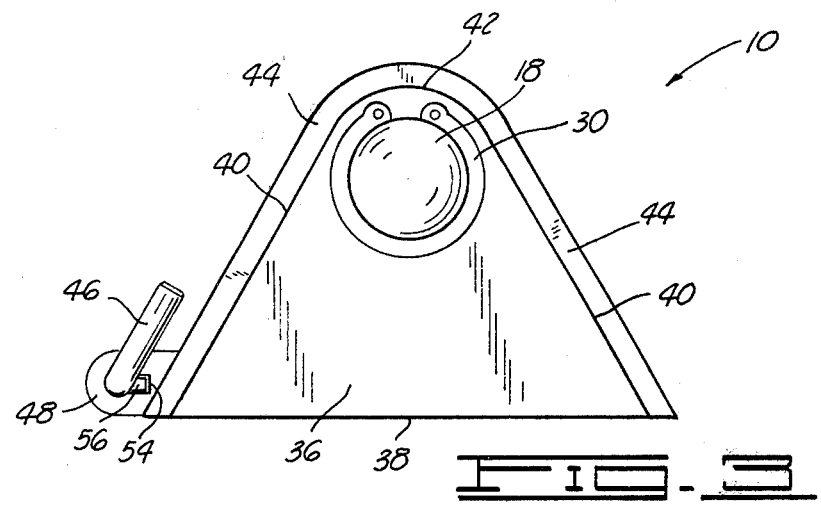
FIG. 3 is a top view of the trailer swivel hitch guide.

In FIG. 3 of the "L" shaped lock pin 46 is shown with the pin stud 56 received in the slot 54. Also, the snap-ring 30 can be seen disposed between the collar 20 of the ball 18 and the top of the base plate 36.

Figure 4:
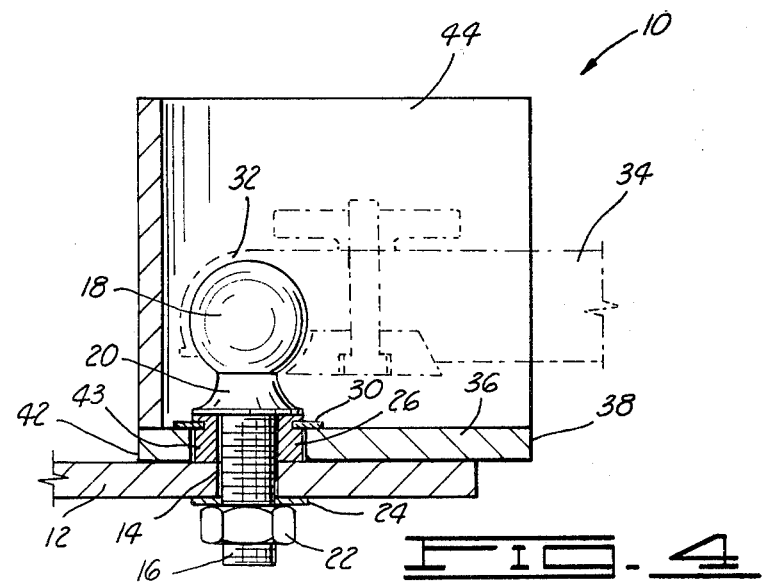
FIG. 4 is a side sectional view of the trailer swivel hitch guide and a portion of the bumper with the tongue of the trailer shown in dotted lines and received around the hitch ball.

In FIG. 4 a side sectional view of the bumper 12 and the guide 10 can be seen with the tongue 32 received around the ball 18 and the trailer 34 is now ready to be pulled by the vehicle. When the trailer 34 is pulled normally, the lock pin 46 would be raised in an unlocked position as shown in FIG. 2. If the trailer 34 was pulled into a sharp turn or jackknifed when backing up, the tongue 32 would rotate on the ball 18 and a portion of the tongue 32 would contact the sidewall 44. Rather than the tongue 32 damaging the sidewall 44 the entire hitch guide 10 rotates on the bumper 12 with the base plate swiveling around the circumference of the insert sleeve 26. The base plate 36 is prevented from moving upwardly or vertically by the snap-ring 30 received in the snap-ring groove 28.

Should the trailer swivel hitch guide 10 no longer be required, the snap-ring 30 can be quickly removed and the guide 10 lifted upwardly past the ball 18 and away from the bumper 12. The sleeve 26 can remain attached to the ball 18 until it is again desired to use the unique trailer swivel hitch guide 10 as described above.

Changes may be made in the construction and arrangement of the parts or elements of the embodiments as described herein without departing from the spirit or scope of the invention defined in the following claims.

What is claimed is:

1. A trailer swivel hitch guide adapted for attachment on the bumper of a vehicle and received around a trailer hitch ball secured to the bumper, the ball used for releasable attachment to a trailer or the like, the guide comprising:
    a base plate having a front, rear and sides, the base plate having an aperture therethrough, the aperture having a circumference greater than the circumference of the ball and adapted for receipt around the ball, the plate resting on top of the bumper;
    an insert sleeve received between the base plate aperture and the ball, the ball secured to the sleeve;
    an upright sidewall attached to the sides of the base plate and angled inwardly toward the ball and around the rear of the plate, the sidewall having a height greater than the height of the hitch ball; and
    guide release means attached to the sidewall for securing the base plate to the bumper when the trailer is being attached to the ball, the guide release means releasing the base plate to swivel around the outer circumference of the sleeve when the vehicle is pulling the trailer.

2. The guide as described in claim 1 further including a snap-ring received around the top of the insert sleeve to prevent the upward or vertical movement of the base plate when the base plate swivels on the insert sleeve.

3. The guide as described in claim 1 wherein the guide release means is a lock pin slidably mounted on the sidewall, the end of the pin adapted for receipt in a lock pin aperture in the bumper when the base plate is secured to the bumper while the trailer is being attached to the ball.

4. A trailer swivel hitch guide for attachment on the bumper of a vehicle and receipt around a trailer hitch ball secured to the bumper, the ball having a ball collar and threaded shank, the ball used for releasable attachment to a trailer or the like, the guide comprising:
    a base plate having a front, rear and sides, the base plate having an aperture therethrough, the aperture having a circumference greater than the circumference of the ball and adapted for receipt around the ball, the plate resting on top of the bumper;
    an insert sleeve received between the base plate aperture and the threaded shank of the ball, the ball collar secured to the top of the sleeve;
    an upright sidewall attached to the sides of the base plate and angled inwardly toward the ball and around the rear of the plate;
    guide release means attached to the sidewall for securing the base plate to the bumper, the guide release means adapted for receipt in an aperture in the bumper when the trailer is being attached to the ball, the guide release means releasing the base plate to allow the base plate to swivel around the outer circumference of the sleeve when the vehicle is pulling the trailer.

5. The guide as described in claim 4 wherein the guide release means is a lock pin slidably mounted on the sidewall, the end of the pin adapted for receipt in the aperture in the bumper.

6. The device as described in claim 4 further including a snap-ring received around the top of the insert sleeve, the snap-ring preventing vertical movement of the base plate when the base plate swivels around the insert sleeve secured to the ball.

* * * * *